Oct. 17, 1967    D. B. HANSON    3,347,252
FLUID SIGNAL GENERATOR
Filed June 18, 1965

INVENTOR
DONALD B. HANSON
BY Norman Friedland
ATTORNEY

United States Patent Office 3,347,252
Patented Oct. 17, 1967

3,347,252
FLUID SIGNAL GENERATOR
Donald B. Hanson, Canton, Conn., assignor to United Aircraft Corporation, East Hartford, Conn., a corporation of Delaware
Filed June 18, 1965, Ser. No. 465,031
3 Claims. (Cl. 137—82)

This invention relates to testing apparatus and particularly to apparatus that produces a pneumatic signal which signal has a controllable amplitude, mean pressure level, and frequency.

For the development of certain pneumatic transmission lines and air inlet controls for high speed aircraft it is necessary to simulate in the laboratory the conditions to which this type of apparatus are subjected. In these applications in order to determine the design criteria and performance information it is necessary to obtain data relating to the response to high frequency pressure signals. While there are available test and laboratory pneumatic signal generators, these heretofore known pneumatic signal generators are deficient inasmuch as they are limited to about 100 cycles per second (c.p.s.) and are generally unstable at low operating pressures.

It is an object of this invention to provide means for generating and controlling the amplitude, frequency and mean pressure level of a pneumatic signal, each independently of each other.

A still further object of this invention is to provide in an apparatus as described means for producing a pneumatic signal that has a frequency range at least between 10 to 400 c.p.s. and higher.

A still further object of this invention is to provide a pneumatic pressure signal generator that modulates fluid discharging from an orifice located downstream of a second orifice at a predetermined timed relationship and which is characterized as being simple and economical to construct and highly reliable although subjected to rugged use.

Other features and advantages will be apparent from the specification and claims and from the accompanying drawings which illustrate an embodiment of the invention.

Figure 1:
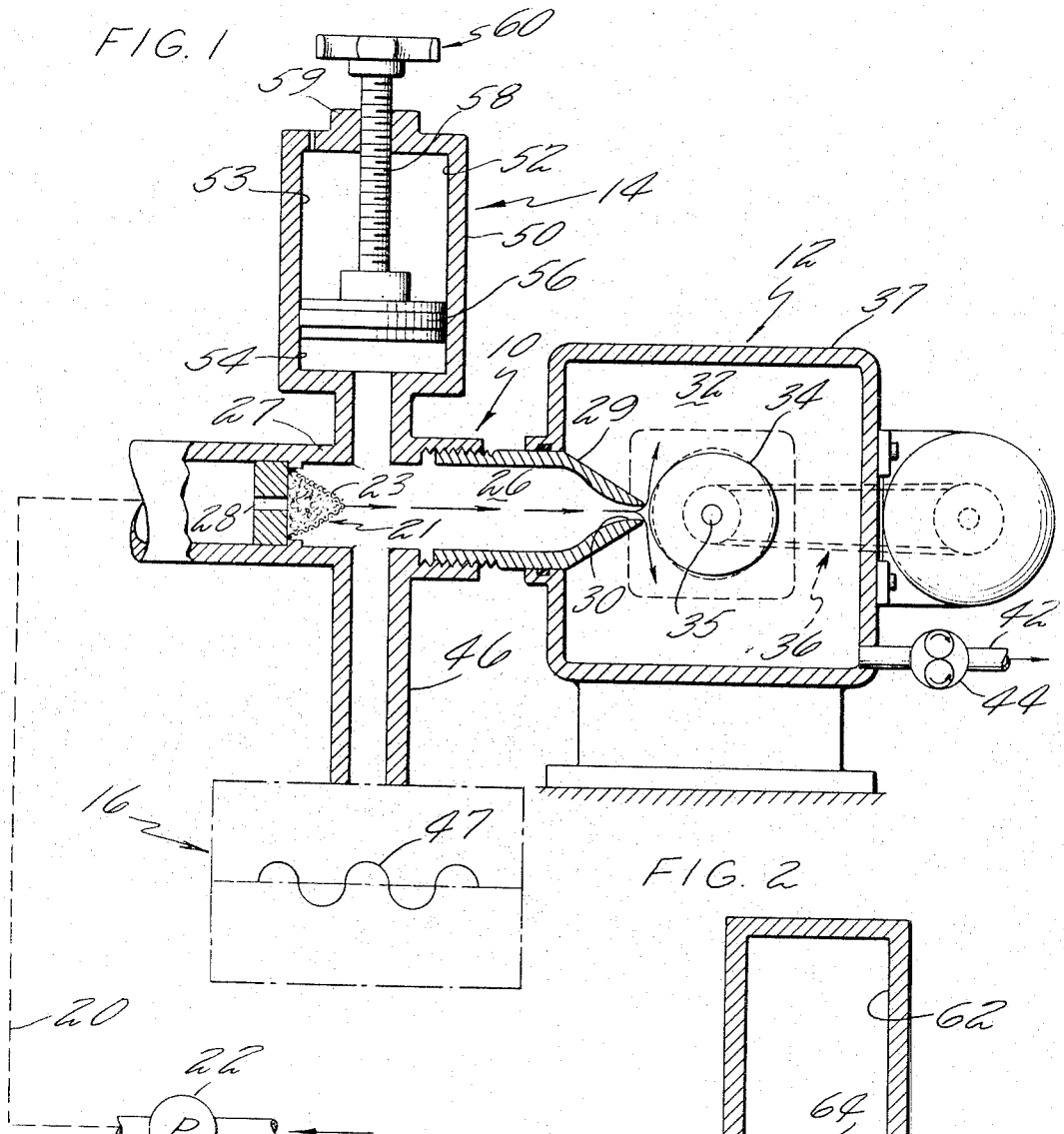
Figure 2:
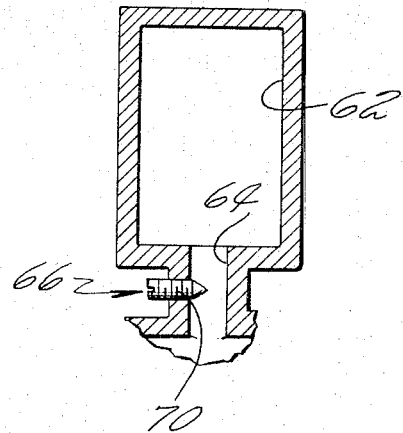

FIGURE 1 is partly in section and partly in schematic illustrating the features of this invention, and FIGURE 2 is a sectional view illustrating an alternative means for controlling the amplitude of the pneumatic signal.

Now referring to the details of FIG. 1 which generally show the pneumatic signal generator comprising a fluid restriction section generally illustrated by numeral 10, a fluid discharge control section generally illustrated by numeral 12, the amplitude control section generally illustrated by numeral 14, and the test load section generally indicated by numeral 16.

As noted from FIG. 1 the fluid, which for purposes of illustration is air, is admitted into pipe 20 and may be pressurized by schematically illustrated pump 22. The air then passes into chamber 26 through fixed upstream orifice 28. In its preferred embodiment it is desirable to run orifice 28 "choked," i.e. at sonic velocity, but it is to be understood that it is contemplated within the scope of this invention that orifice 28 may run "unchoked." When "choked," the air passes through orifice 28 at constant sonic flow and hence, is independent of the pressure in chamber 26. If the mean pressure level in chamber 26 is less than half of ambient or atmospheric pressure, then the air can be taken directly therefrom without the use of pump 22. In that instance, which presumably would be for many of the applications, fixed orifice 28 would communicate directly with the ambient.

In certain applications noise may present a problem but may be attenuated by noise attenuator 21 mounted in chamber 26 adjacent orifice 28. Attenuator 21 may consist of a stainless steel screen 23 formed in the shape of a cone having its base welded to the wall defining fixed orifice 28. Steel wool is inserted within steel screen 23 and is supported thereby.

Chamber 26 may be formed from two cylindrical outer casing members 27 and 29 which are rotatably secured to each other in any suitable manner such as by the threads shown in the drawing so that the casing member 29 can move axially. The forward end of casing member 29 converges inwardly to form a suitable nozzle or restriction 30 that projects into chamber 32.

From the foregoing it is apparent that chamber 26 defines a passage having spaced restrictions and the air discharging from the outlet restriction defined by nozzle 30 impinges against the peripheral surface of cam 34 rotatably supported by shaft 35 which is journalled (not shown) in casing 37. The nozzle 30 and cam 34 form a variable restriction. Cam 34 may be driven by any known variable speed means and is illustrated as being driven by a pulley-belt arrangement generally indicated by numeral 36 and serves to vary the variable restriction in a predetermined timed relationship. Pulley 39 is driven by a suitable motor such as the schematically shown electrical motor 38 which may be supported to the casing 37.

Chamber 32 is evacuated through conduit 42 which is connected to schematically shown evacuator pump 44 so that the flow through nozzle 30 is sonic and therefore linear with the cam gap.

The device intended to be tested is suitably connected through pipe 46 and is shown in blank by the dash lines. The pneumatic pulse generated by the pneumatic signal generator and which would appear in test cell 16 is a waveform illustrated graphically by reference numeral 47. The shape of the wave is controlled by the shape of the cam being utilized. In this instance a double lobe cam is utilized for producing the sinusoidal wave. It is possible to obtain any number of waveforms merely by replacing cam 34 with other shaped cams.

In accordance with this invention the mean pressure level can also be controlled, say within the range between 2.5 inches of mercury absolute to 50 p.s.i.g. This is accomplished by controlling the mean curtain area of nozzle 32 which is accomplished by setting the gap between the peripheral surface of cam 34 with the end of nozzle 30 by moving element 29 axially. Of course, gross changes of the mean pressure are made by changing the size of orifice 28 or the upstream supply pressure. In the heretofore known types of pneumatic signal generators the only way of changing the mean pressure level was by changing the pressure supply which necessitated the inclusion of an additional pressure supply and regulator.

The frequency of the pneumatic signal generated in line 46 or between the fixed restriction 28 and the variable nozzle 30 is controlled by the speed at which cam 34 rotates. Thus it is only necessary to vary the rotational speed of pulley 39 by any suitable variable speed device to obtain the desired frequency of the pneumatic signal.

The amplitude of this signal is controlled by the amplitude controller generally indicated by numeral 14 which comprises housing 50 defining a chamber 52 which is divided into sections 53 and 54. An adjustable piston 56 dividing chamber 52 is connected by stem 58 and is threadably mounted in boss 59. An externally accessible handle 60 serves to move piston 56 within chamber 52, to change the volume of chamber 54 and hence control the amplitude of the signal. The signal in this manner can be continuously controlled by the adjustment of piston 56. To attenuate the signal the piston is cranked back increasing the volume being modulated.

FIG. 2 illustrates another means for controlling the amplitude which is by providing a large accumulator cavity 62 which is in communication with chamber 26 through the opening 64. A suitable gate valve, which is schematically illustrated by numeral 66 having an external setting mechanism 70, is disposed in opening 64 and is adjusted to change the area and thus the flow rate into and out of the chamber 62. In this manner the amplitude may be controlled similarly to the mechanism described in connection with reference numeral 14.

Thus, according to this invention it is possible to provide in relatively simple mechanism a device that produces a pneumatic modulated pressure signal which is capable of controlling independently of each other the amplitude, the mean pressure level, and the frequency. This device makes it possible to use a single cam for all signal amplitudes, mean pressure levels and frequencies. The substitution of one cam for another can change the waveform of the generated pressure signal. While gross adjustments of the pressure level can be accomplished by changing the upstream orifice or the upstream supply pressure, the fine adjustment of the mean pressure level can be made by spacing nozzle 30 in or away from the cam 34. The signal amplitude is adjusted by changing the volume of chamber 54.

The operation of this mechanism can best be described by considering the mathematical expressions described below. For the purpose of this description the listed notations are defined as follows and numerical subscripts refer to the elements referenced in the drawing.

$X$ = Nozzle to cam spacing
$X_o$ = Average cam spacing
$2X_m$ = Cam lift
$P$ = Pressure output
$P_o$ = Average pressure
$P_m$ = Pressure signal amplitiude
$\omega = 2\pi f/N$
$f$ = Signal frequency
$t$ = Time
$N$ = Number of lobes on cam
$\phi$ = Phase lag
$V$ = Volume
$X = X_o + X_m \sin \omega t$ By virtue of the signal generator the time varying cam spacing in the above expression is changed to time varying pressure signal as shown in the equation as follows:

$$P_{26} = P_o + P_m \sin(\omega t + \phi)$$

It is apparent from the foregoing that $P_o$ is a function of $(X_o)$ and
$P_m$ is a function of $(V_{54}, \omega)$ so that from the above it is apparent that $P_o$, the mean pressure level, is adjusted by changing the gap between nozzle 30 and cam 34; $P_m$, the amplitude, is adjusted by changing the volume of chamber 54; and $\omega$, the frequency, is adjusted by changing the rotational speed of cam 34.

What has been described is a simple, economical, and accurate signal generator that has been successfully tested and provides:

(1) an adjustable accumulator to give continuous control of the signal amplitude by the simple mechanical operation of turning a knob to change the cylinder volume. This device makes it possible to use one cam for all signal amplitudes, mean levels, and frequencies. The mean pressure level is independent of amplitude and frequency setting signals.

(2) Provision for the use of interchangeable cams to give different fluid waveforms.

(3) Provision for fine adjustments of the mean pressure level by changing the mean spacing, "$X_o$," of the nozzle from the cam.

It should be understood that the invention is not limited to the particular embodiments shown and described herein, but that various changes and modifications may be made without departing from the spirit or scope of this novel concept as defined by the following claims.

I claim:

1. Test apparatus for generating a pulsating fluid signal to be applied to mechanism intended to be tested including an evacuated chamber, a fluid passage terminating in said evacuated chamber, a fixed restriction disposed at the inlet of said fluid passage, a variable restriction disposed at the outlet of said passage, motor driver inluding a rotation member for varying said variable restriction in timed relation corresponding to a predetermined frequency of said pulsating fluid signal, means interconnecting the fluid passage at a point intermediate said fixed and said variable restriction and the mechanism intended to be tested, and amplitude control means including a fluid receiving accumulator communicating with said passage intermediate said fixed restriction, said variable restriction for controlling the amplitude and means for varying the volume of said accumulator.

2. Test apparatus as claimed in claim 1 wherein said volume means includes a piston, and mechanical means external of said accumulator for positioning said piston.

3. Test apparatus for generating a pulsating fluid signal to be applied to mechanism intended to be tested including a fluid conducting passage having a restricted inlet and an axially spaced restricted outlet, motor driven means for varying the area of said restricted outlet, said motor driven means including a cam rotatably mounted adjacent the restricted outlet having a peripheral surface for varying the area thereof, means for interconnecting the fluid conducting means at a point intermediate said inlet and said outlet and the mechanism intended to be tested, means for controlling the amplitude, mean pressure level and frequency of the fluid signal independently of each other, said amplitude controlling means including a fluid receiving chamber communicating with said passage means between said inlet and said outlet and a piston in said fluid receiving chamber for varying the volume thereof, and said mean pressure level controlling means including means for displacing said outlet relative to said cam, and said frequency controlling means including means for imparting rotatable motion to said cam.

References Cited
UNITED STATES PATENTS

| | | | |
|---|---|---|---|
| 2,824,292 | 2/1958 | Christoph | 137—82 X |
| 3,048,770 | 8/1962 | Nye | 91—47 X |
| 3,099,995 | 8/1963 | Raufenbarth. | |
| 3,219,049 | 11/1965 | Joesting | 137—85 |
| 3,228,602 | 1/1966 | Boothe | 235—201 |

ALAN COHAN, *Primary Examiner.*

UNITED STATES PATENT OFFICE
CERTIFICATE OF CORRECTION

Patent No. 3,347,252                          October 17, 1967

Donald B. Hanson

It is hereby certified that error appears in the above numbered patent requiring correction and that the said Letters Patent should read as corrected below.

Column 4, lines 21 and 22, for "motor driver inluding a rotation" read -- motor driven means including a rotating --; same column 4, line 33, after "volume" insert -- varying --.

Signed and sealed this 22nd day of October 1968.

(SEAL)
Attest:

Edward M. Fletcher, Jr.                          EDWARD J. BRENNER
Attesting Officer                               Commissioner of Patents